UNITED STATES PATENT OFFICE.

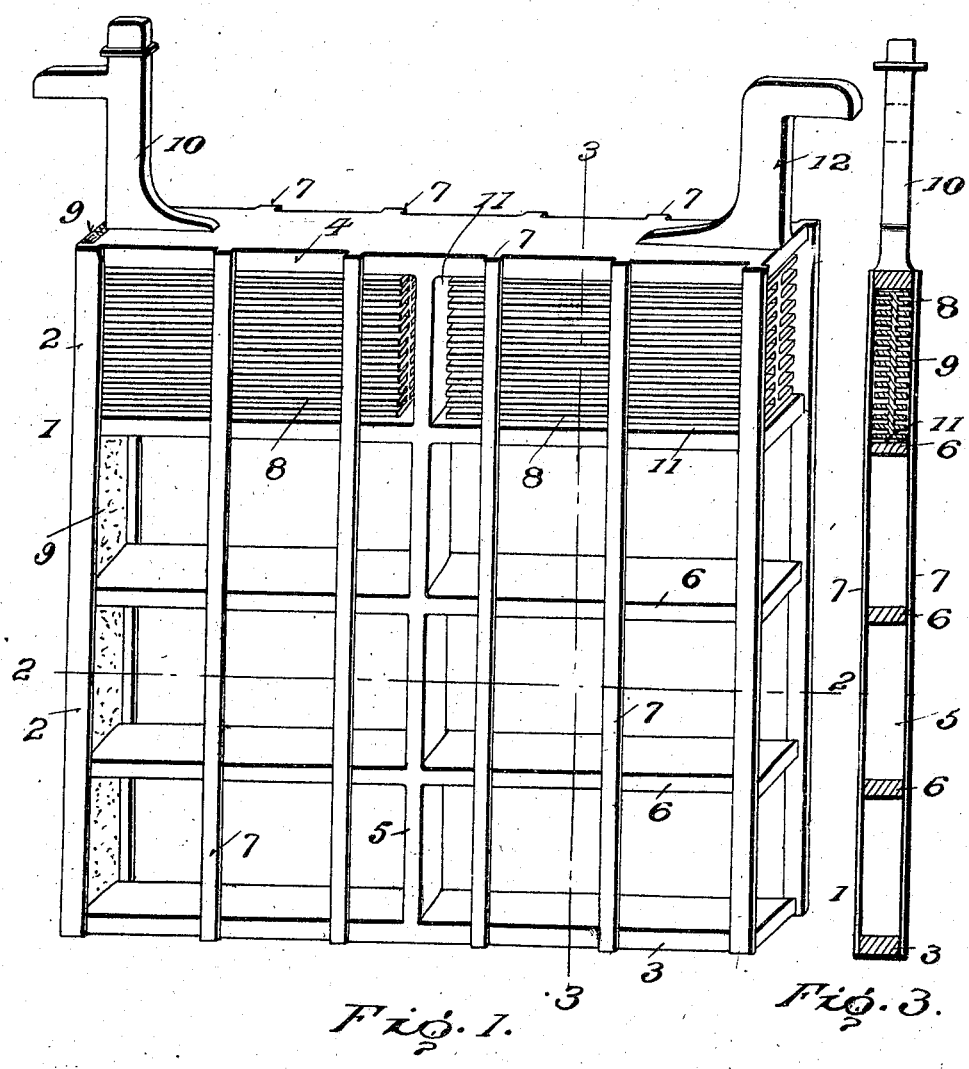

JOSEPH MARX, OF BUFFALO, NEW YORK.

STORAGE-BATTERY PLATE OR GRID.

No. 867,391.           Specification of Letters Patent.           Patented Oct. 1, 1907.

Application filed January 30, 1907. Serial No. 354,927.

*To all whom it may concern:*

Be it known that I, JOSEPH MARX, a citizen of the United States, residing at Buffalo, in the county of Erie and State of New York, have invented certain new and useful Improvements in Storage-Battery Plates or Grids, of which the following is a specification.

This invention contemplates certain new and useful improvements in electro-chemically formed storage battery plates or electrodes.

It is well recognized that storage battery plates of the Plante type are apt to bulge or buckle during their operation of charging and discharging, especially at low rates. The positive plates after buckling are very apt to become attached to, or touch the next plate, which is the negative plate, resulting in the establishing of a short circuit, with the consequent result that in a short time the plate is rendered useless.

My invention has for its object a storage battery plate or electrode, which will avoid this difficulty and which will not bulge or buckle out, but will be characterized by an increase of durability and efficiency over plates of the ordinary construction.

With these and other objects in view, as will more fully appear as the description proceeds, the invention consists in certain constructions and arrangements of the parts hereinafter described and particularly pointed out in the appended claims.

For a full description of the invention and the merits thereof and also to acquire a knowledge of the details of construction and the means for effecting the result, reference is to be had to the following description and accompanying drawings, in which:—

Figure 1 is a perspective view of my improved storage battery electrode; Fig. 2 is a horizontal sectional view thereof, on the line 2—2 of Fig. 1; and Fig. 3 is a vertical transverse section on the line 3—3 of Fig. 1.

Corresponding and like parts are referred to in the following description and indicated in all the views of drawings by the same reference characters.

My improved storage battery plate, or grid, comprises an antimonious lead frame 1, which embodies spaced and parallel side bars 2, a preferably solid bottom and top bars 3 and 4, and an intermediate and preferably solid longitudinal bar 5. This frame is formed with a series of superposed shelves 6 that are preferably solid as shown and with lattice work on both sides of said shelves. The bars 7 that constitute the lattice work in connection with the shelves extend preferably at right angles to the shelves and form therewith comparatively large side openings as clearly illustrated.

8 designates the lead units of the battery plate which are made of pure lead and are cast, ribbed or formed by hydraulic pressure, and said units are adapted to be inserted into the frame through the open ends thereof between said shelves 6 and are subsequently molded or burned to the frame elements or bars 9 that are placed between the parallel side bars 2 after the units have been inserted in place. When the lead units are in their proper positions they provide spaces 11 around them so as to afford the said units a chance to increase in size, which will take place through the charging and discharging, throughout the life of the plate.

10 and 12 designate the suspending lugs, which may be of any desired size and shape and which usually vary according to the size of the plate.

From the foregoing description in connection with the accompanying drawings, it will be seen that the ribs or bars 7 extending up and down with respect to the frame and on both sides of the shelves 6 will effectively hold the units in the frame and prevent them from buckling or bulging out.

Having thus described the invention, what is claimed as new is:—

1. A storage battery plate, comprising a frame embodying spaced side bars, bottom and top bars and an intermediate bar, horizontally extending shelves and vertically extending spaced ribs on both sides of said shelves, and units adapted to be held between said shelves and ribs, as and for the purpose specified.

2. A storage battery plate or grid, consisting of a frame provided with end openings and with a series of superposed shelves and with ribs on both sides of said shelves, units adapted to be inserted in the end openings of the frame between said shelves and the ribs, and frame elements 9 to which the said units are adapted to be secured.

3. A storage battery plate or grid, comprising a frame provided with a series of superposed shelves and ribs extending vertically on both sides of said shelves, the ribs being spaced from each other with respect to the ribs on the same side of a shelf, and units held between said shelves and said ribs, with spaces 11 around the units, as and for the purpose set forth.

In testimony whereof I affix my signature in presence of two witnesses.

JOSEPH MARX. [L. S.]

Witnesses:
JNO. A. MINCHEN,
EDWIN D. COVENTRY.